United States Patent
Emmerson et al.

(10) Patent No.: US 10,443,493 B2
(45) Date of Patent: Oct. 15, 2019

(54) EXHAUST MIXER FOR WAVE ROTOR ASSEMBLY

(71) Applicant: Rolls-Royce North American Technologies, Inc., Indianapolis, IN (US)

(72) Inventors: Calvin W. Emmerson, Bloomington, IN (US); Philip H. Snyder, Avon, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 926 days.

(21) Appl. No.: 15/041,191

(22) Filed: Feb. 11, 2016

(65) Prior Publication Data

US 2016/0230656 A1  Aug. 11, 2016

Related U.S. Application Data

(60) Provisional application No. 62/114,919, filed on Feb. 11, 2015.

(51) Int. Cl.
| | |
|---|---|
| *F02C 3/16* | (2006.01) |
| *F02C 3/14* | (2006.01) |
| *F01N 13/18* | (2010.01) |
| *F01D 9/02* | (2006.01) |
| *F02C 5/04* | (2006.01) |
| *F23R 3/56* | (2006.01) |
| *F23R 7/00* | (2006.01) |

(52) U.S. Cl.
CPC ............... *F02C 3/14* (2013.01); *F01D 9/023* (2013.01); *F01N 13/1805* (2013.01); *F02C 3/16* (2013.01); *F02C 5/04* (2013.01); *F23R 3/56* (2013.01); *F23R 7/00* (2013.01);
(Continued)

(58) Field of Classification Search
CPC .... F23R 7/00; F23R 3/56; F01D 9/023; F02C 5/04; F02C 3/16
See application file for complete search history.

(56) References Cited

U.S. PATENT DOCUMENTS 2,904,242 A * 9/1959 Pearson .................. F04F 13/00
 417/226
3,417,564 A * 12/1968 Call .......................... F02C 5/12
 60/248
(Continued)

FOREIGN PATENT DOCUMENTS

| CN | 103133138 A | 6/2013 |
|---|---|---|
| EP | 0503277 A1 | 9/1992 |
| EP | 1710417 A2 | 10/2006 |

OTHER PUBLICATIONS

Extended European Search Report, European Application No. 16153420. 1-1607, dated Jul. 1, 2016, 6 pages.
(Continued)

*Primary Examiner* — Ted Kim
(74) *Attorney, Agent, or Firm* — Barnes & Thornburg LLP

(57) ABSTRACT

A wave rotor assembly includes a wave rotor combustor and an exit duct. The wave rotor combustor includes an aft plate formed to include an exit port and a rotor drum mounted for rotation relative to the aft plate. The rotor drum is formed to include a plurality of rotor passages arranged to align with the exit port during rotation of the rotor drum. The exit duct is coupled to the aft plate and defines a passage arranged to receive exhaust gasses flowing through the exit port.

17 Claims, 7 Drawing Sheets

(52) U.S. Cl.
CPC .............. *F05D 2250/323* (2013.01); *F05D 2260/2212* (2013.01); *Y02T 50/676* (2013.01)

(56) References Cited

U.S. PATENT DOCUMENTS

| | | |
|---|---|---|
| 6,449,939 B1 | 9/2002 | Snyder |
| 6,460,342 B1 * | 10/2002 | Nalim ................ F02C 3/02 60/39.45 |
| 6,526,936 B2 | 3/2003 | Nalim |
| 7,137,243 B2 | 11/2006 | Snyder et al. |
| 7,526,912 B2 | 5/2009 | Tangirala et al. |
| 7,621,118 B2 | 11/2009 | Snyder et al. |
| 8,117,828 B2 | 2/2012 | Snyder et al. |
| 8,127,533 B2 | 3/2012 | Lu et al. |
| 8,443,583 B2 | 5/2013 | Nalim et al. |
| 8,555,612 B2 | 10/2013 | Snyder et al. |
| 2006/0260291 A1 | 11/2006 | Vandervort et al. |
| 2007/0157625 A1 | 7/2007 | Snyder et al. |
| 2014/0311121 A1 * | 10/2014 | Hill ................ F23R 3/52 60/204 |

OTHER PUBLICATIONS

Shumaker, R.H and Schrady, D.A., Proceedings of the 1985 ONR/NAVAIR Wave Rotor Research and Technology Workshop, May 1985, 425 pages.

Snyder, Philip H., Seal Technology Development for Advanced Component for Airbreathing Engines, Dec. 2008, 138 pages.

\* cited by examiner

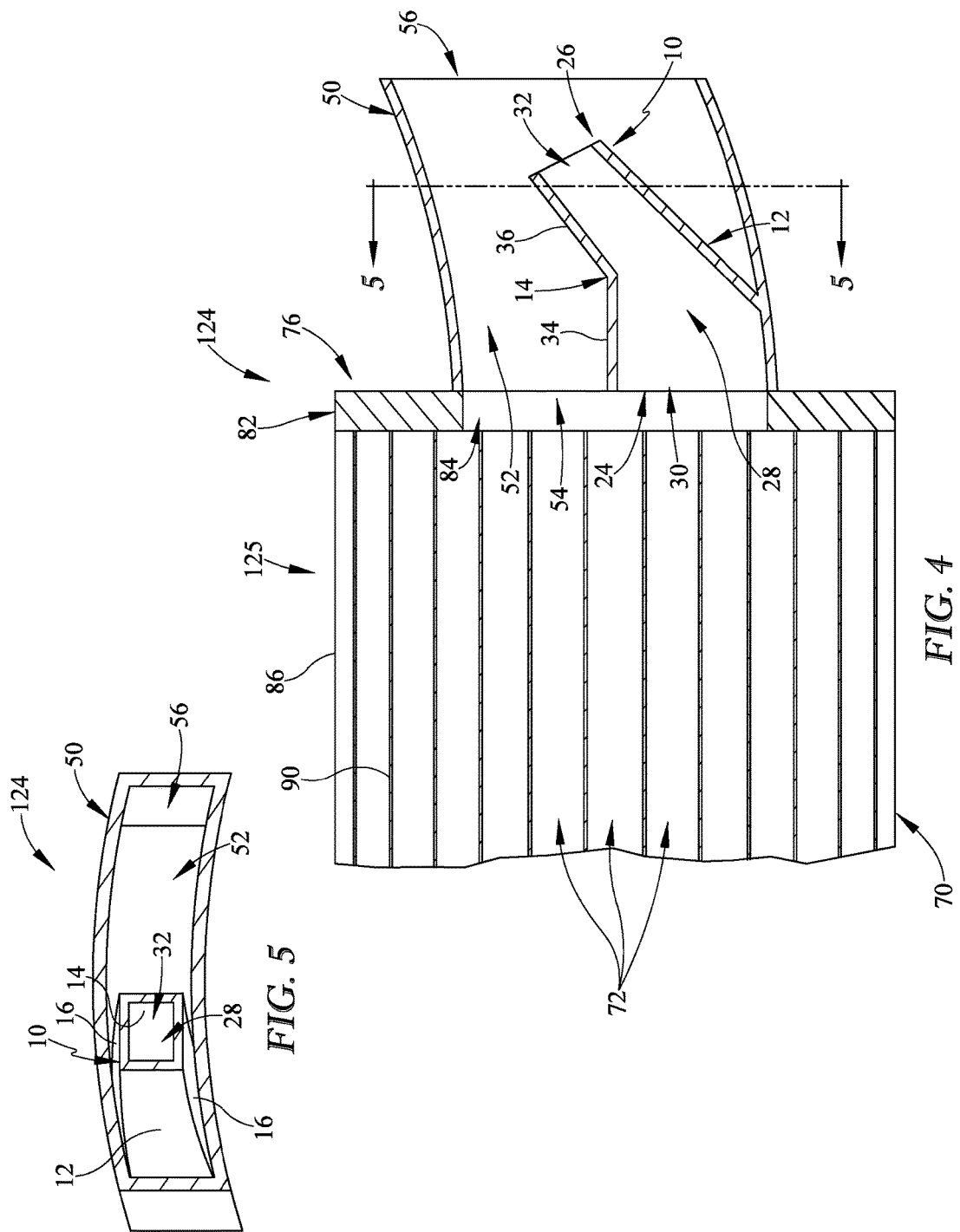

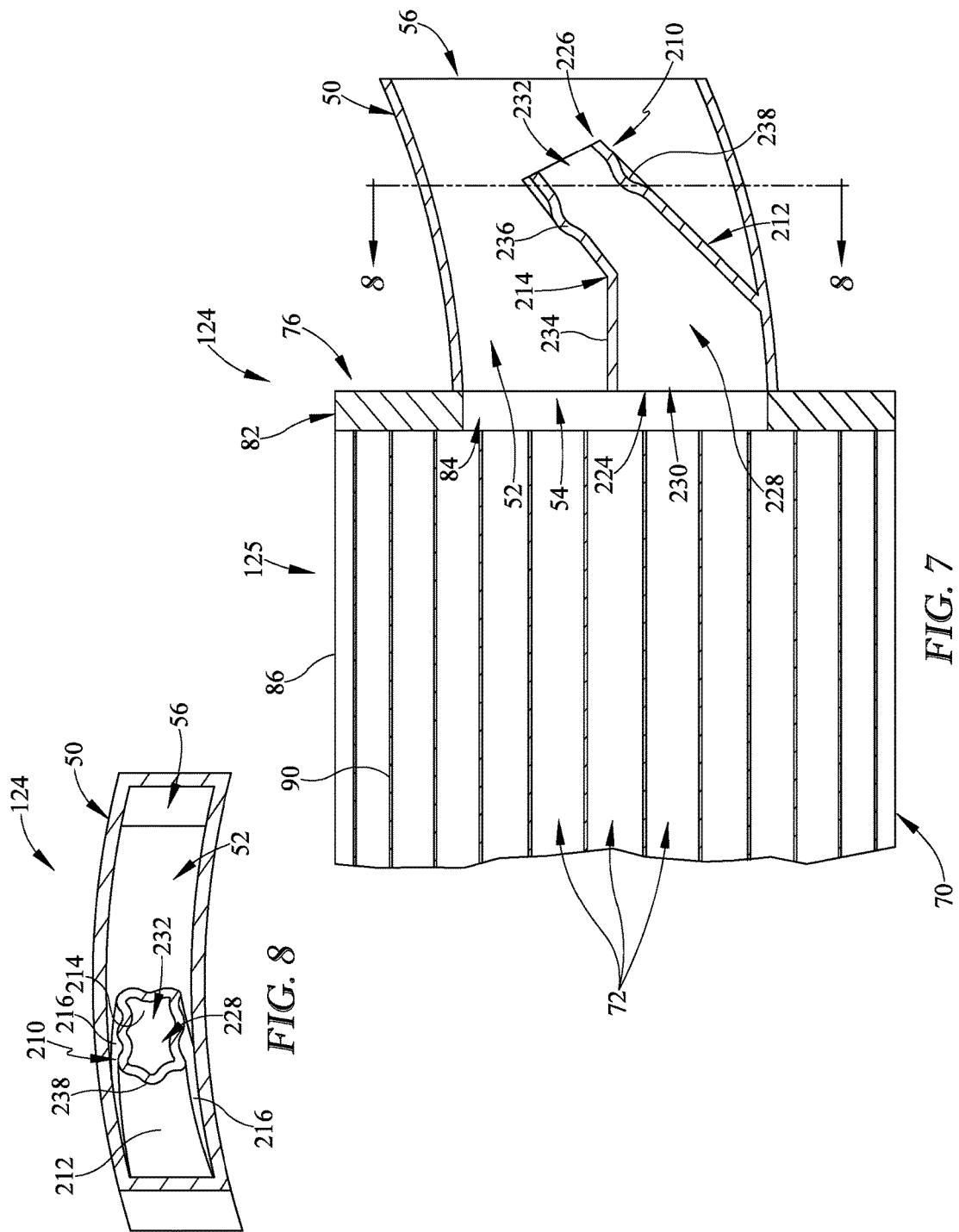

EXHAUST MIXER FOR WAVE ROTOR ASSEMBLY

CROSS REFERENCE TO RELATED APPLICATIONS

This application claims priority to and the benefit of U.S. Provisional Patent Application No. 62/114,919, filed 11 Feb. 2015, the disclosure of which is now expressly incorporated herein by reference.

FIELD OF THE DISCLOSURE

The present disclosure relates generally to wave rotor assemblies, and more specifically to exhaust mixers used in wave rotor assemblies.

BACKGROUND

Gas turbine engines are used to power aircraft, watercraft, power generators, and the like. Gas turbine engines typically include a compressor, a combustor, and a turbine. The compressor compresses air drawn into the engine and delivers high-pressure air to the combustor. In the combustor, a mixture including fuel and the high-pressure air is ignited. Products of the combustion reaction in the combustor are directed into the turbine where work is extracted to drive the compressor and, sometimes, an output shaft. Leftover combustion products are exhausted out of the turbine and may provide thrust in some applications.

In some engines, the combustor includes a wave rotor assembly that burns fuel and high-pressure air and discharges combustion products to the turbine to drive rotation of the turbine. Wave rotor assemblies may include a wave rotor combustor and an exhaust duct. Typical wave rotor combustors include an inlet assembly, an outlet assembly spaced apart from the inlet assembly along a central axis of the wave rotor combustor, and a rotor drum positioned therebetween. The inlet assembly directs a flow of air and fuel into rotor passages formed in the rotor drum. The rotor drum receives and combusts the fuel-air mixture to produce hot high-pressure products as the rotor drum rotates about the central axis. The outlet assembly provides an outlet port for the hot high-pressure products to exit the wave rotor combustor. The exhaust duct directs the hot high-pressure products out of the wave rotor combustor into the turbine.

SUMMARY

The present disclosure may comprise one or more of the following features and combinations thereof.

A wave rotor assembly may include a wave rotor combustor, an exit duct, and an exhaust mixer. The wave rotor combustor may include an aft plate and a rotor drum. The aft plate may be formed to include an exit port that extends circumferentially along an arc about a central axis of the combustor assembly. The rotor drum may be mounted for rotation relative to the aft plate about the central axis. The rotor drum may be formed to include a plurality of rotor passages that extend along the central axis. The rotor passages may be arranged so that the rotor passages align with the exit port at predetermined intervals when the rotor drum rotates about the central axis to allow exhaust gasses in the rotor passages to flow through the exit port.

The exit duct may be coupled to the aft plate and may define a duct passage arranged to receive the exhaust gasses flowing through the exit port. The exhaust mixer may be located in the passage and may be arranged to circumferentially redirect relatively-high velocity exhaust gasses received by the exit duct toward relatively-low velocity exhaust gasses received by the exit duct so that the relatively-high velocity exhaust gasses are mixed with the relatively-low velocity exhaust gasses in the passage.

In some embodiments, the exhaust mixer may include a first sidewall. The first sidewall may extend axially and circumferentially into the duct passage relative to the central axis to redirect the relatively-high velocity exhaust gasses toward the relatively-low velocity exhaust gasses.

In some embodiments, the exhaust mixer may include a second sidewall spaced apart circumferentially from the first sidewall. The second sidewall may extend axially and circumferentially into the passage to redirect the relatively-high velocity exhaust gasses toward the relatively-low velocity exhaust gasses.

In some embodiments, the second sidewall may include a forward leg and an aft leg. The forward leg may extend axially into the passage and the aft leg may extend from the forward leg axially and circumferentially into the passage.

In some embodiments, the exhaust mixer may further include a radial outer wall and a radial inner wall spaced apart radially from the radial outer wall relative to the central axis. The radial outer wall and the radial inner wall may extend between and interconnect the first and second sidewalls to form a mixer passage extending through the exhaust mixer.

In some embodiments, the exhaust mixer may include a front end and a back end axially spaced apart from the front end relative to the central axis. A height of the first sidewall may decrease from the front end to the back end. A height of the second sidewall may decrease from the front end to the back end.

In some embodiments, the exhaust mixer may form a mixer passage extending through the exhaust mixer, an inlet aperture opening into the mixer passage, and an outlet aperture opening into the mixer passage. In some embodiments, the inlet aperture has an inlet area, the outlet aperture has an outlet area, and the inlet area may be greater than the outlet area. In some embodiments, the relatively-high velocity exhaust gasses may exit the exhaust mixer through the outlet aperture at a supersonic velocity.

In some embodiments, the exhaust mixer has a front end adjacent to the inlet aperture and a back end axially spaced apart from the front end. The back end may have a convoluted shape.

According to another aspect of the present disclosure, a wave rotor assembly may include a wave rotor combustor, an exit duct, and an exhaust mixer. The wave rotor may include an aft plate formed to include an exit port and a rotor drum mounted for rotation relative to the aft plate. The rotor drum may be formed to include a plurality of rotor passages arranged to align with the exit port during rotation of the rotor drum. The exit duct may be coupled to the aft plate and define a duct passage arranged to receive exhaust gasses flowing through the exit port. The exhaust mixer may be located in the duct passage and arranged to redirect the exhaust gasses received by the exit duct.

In some embodiments, the exhaust mixer may be arranged to redirect relatively-high velocity exhaust gasses received by the exit duct in a circumferential direction toward relatively-low velocity exhaust gasses received by the exit duct so that the relatively-high velocity exhaust gasses are mixed with the relatively-low velocity exhaust gasses in the passage. In some embodiments, the exhaust mixer may include a first sidewall that extends axially and circumferentially into the duct passage to redirect the relatively-high velocity exhaust gasses toward the relatively-low velocity exhaust gasses.

In some embodiments, the exhaust mixer may include a second sidewall that is circumferentially spaced apart from the first sidewall. The second sidewall may extend axially and circumferentially into the passage to redirect the relatively-high velocity exhaust gasses toward the relatively-low velocity exhaust gasses.

In some embodiments, the exhaust mixer may be formed to include a mixer passage extending through the exhaust mixer, an inlet aperture opening into the mixer passage, and an outlet aperture opening into the mixer passage. The inlet aperture has an inlet area. The outlet aperture has an outlet area. The inlet area may be greater than the outlet area.

In some embodiments, the exhaust mixer may include a first sidewall, a second sidewall circumferentially spaced apart from the first sidewall, a radial outer wall, and a radial inner wall spaced apart radially from the radial outer wall relative to the central axis. The radial outer wall and the radial inner wall may extend between and interconnect the first and second sidewalls between the front and back ends to define the mixer passage.

In some embodiments, the exhaust mixer may include a front end and a back end axially spaced apart from the front end relative to a central axis of the combustor assembly. A height of the first sidewall may decrease from the front end to the back end. A height of the second sidewall may decrease from the front end to the back end. In some embodiments, the relatively-high velocity exhaust gasses may exit the exhaust mixer through the outlet aperture at a local sonic velocity.

According to another aspect of the present disclosure, a method of making a combustor assembly is provided. The method may comprise providing a wave rotor, an exit duct, and an exhaust mixer. The wave rotor may include an aft plate formed to include an exit port and a rotor drum mounted for rotation relative to the aft plate. The rotor drum may be formed to include a plurality of rotor passages arranged to align with the exit port at predetermined intervals during rotation of the rotor drum, and the exit duct defines a passage. The method may comprise coupling the exit duct to the aft plate to cause the passage to be arranged to receive exhaust gasses flowing through the exit port. The method may comprise locating the exhaust mixer in the passage to redirect exhaust gasses received by the exit duct.

In some embodiments, the exit duct may be arranged to receive relatively-low velocity exhaust gasses and relatively-high velocity exhaust gasses. The exhaust mixer may be arranged to redirect the relatively-high velocity exhaust gasses received by the exit duct toward the relatively-low velocity exhaust gasses received by the exit duct so that the relatively-high velocity exhaust gasses are mixed with the relatively-low velocity exhaust gasses in the passage.

In some embodiments, the exhaust mixer may be arranged to cause relatively-high pressure exhaust gasses located in the rotor passages aligned circumferentially with the exhaust mixer to undergo a first expansion. In some embodiments, the exit duct may be arranged to cause relatively-low velocity exhaust gasses located in the rotor passages aligned circumferentially with the exit duct to undergo a second expansion.

These and other features of the present disclosure will become more apparent from the following description of the illustrative embodiments.

BRIEF DESCRIPTION OF THE DRAWINGS

FIG. 4 is a sectional view of the wave rotor assembly of FIG. 2 taken at line 4-4 showing that, as the wave rotor combustor rotates about the central axis, a number of rotor passages align with and open into the exit duct and that the exhaust mixer extends into the duct passage to redirect a portion of the gasses received by the exit duct;

FIG. 5 is a sectional view of the exhaust mixer of FIG. 4 taken at line 5-5 showing that the exhaust mixer extends circumferentially and axially into the duct passage and that an inlet of the exhaust mixer is larger than an outlet of the exhaust mixer;

FIG. 7 is a sectional view of another embodiment of an exhaust mixer for use in the wave rotor assembly of FIG. 1 showing that, as the wave rotor combustor rotates about the central axis, a number of rotor passages align with and open into the exit duct and that the exhaust mixer extends into the duct passage to redirect a portion of the exhaust gasses received by the exit duct;

FIG. 8 is a sectional view of the exhaust mixer of FIG. 7 taken at line 8-8 showing that the exhaust mixer extends circumferentially and axially into the duct passage and that an outlet end of the exhaust mixer has a convoluted shape;

DETAILED DESCRIPTION OF THE DRAWINGS

Figure 1:
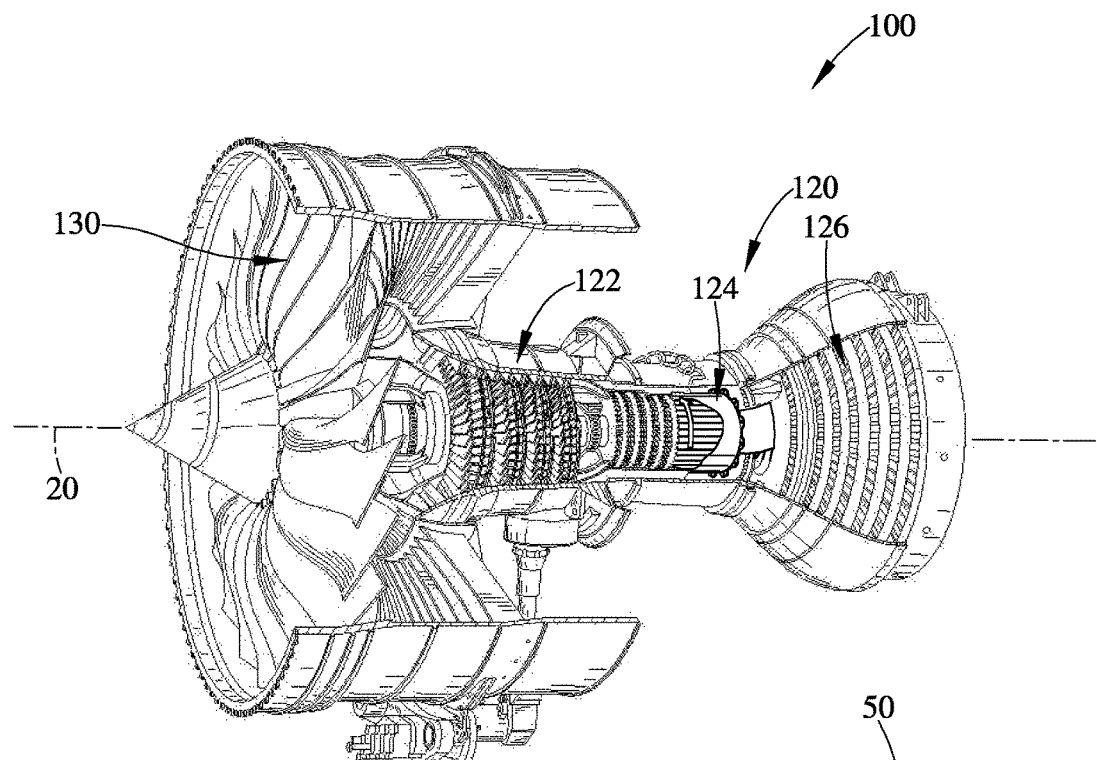
FIG. 1 is a cutaway view of a gas turbine engine including a wave rotor assembly arranged to receive a mixture of fuel and air and to ignite the fuel-air mixture to produce hot high-pressure products that are directed into a turbine to drive the engine.

For the purposes of promoting an understanding of the principles of the disclosure, reference will now be made to a number of illustrative embodiments illustrated in the drawings and specific language will be used to describe the same.

Figure 2:
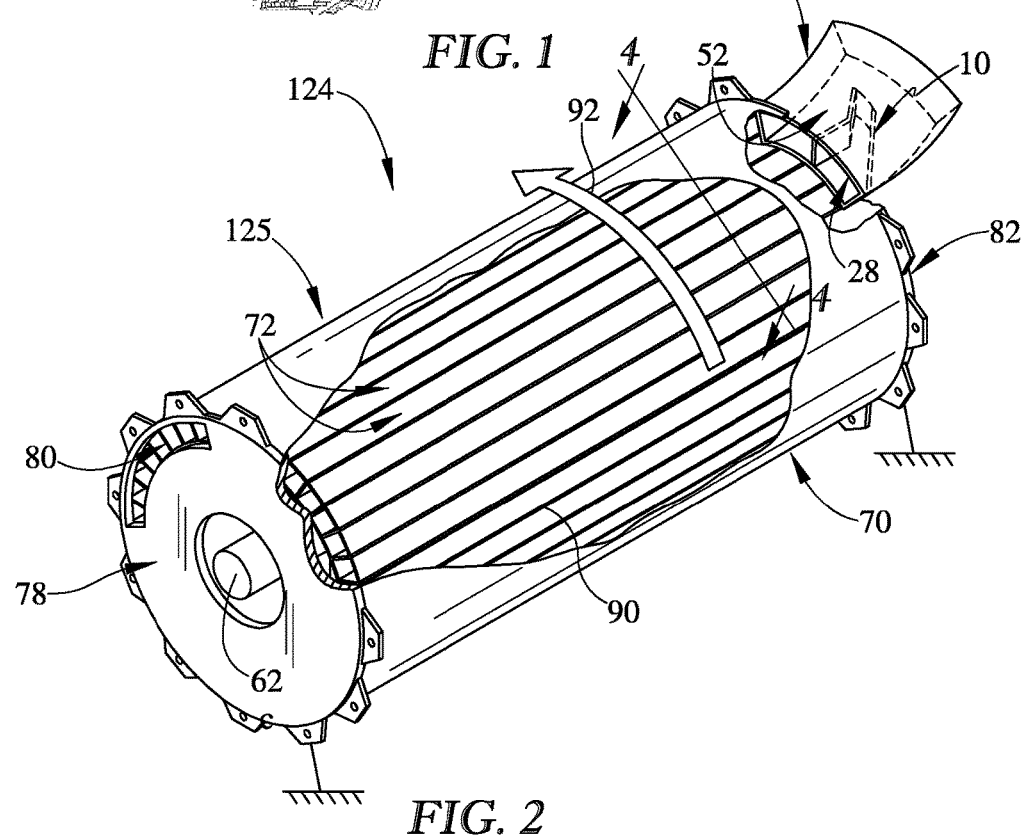
FIG. 2 is a cutaway view of the wave rotor assembly included in the gas turbine engine of FIG. 1 showing that the wave rotor assembly includes, from left to right, a wave rotor combustor formed to include a plurality of rotor passages arranged to rotate about a central axis of the wave rotor assembly, an exit duct arranged to direct combusted gasses out of the wave rotor combustor into the turbine, and an exhaust mixer located in the exit duct and arranged to mix the gasses flowing through the exit duct.

An illustrative aerospace gas turbine engine 100 includes a wave rotor assembly 124 as part of an engine core 120 that powers a fan assembly 130 as shown in FIG. 1. The wave rotor assembly 124 combusts a fueled air 354 as part of a combustion process 300 to power the engine 100. An illustrative exhaust mixer 10 is included in the wave rotor assembly 124 to mix exhaust gasses produced during the combustion process 300 as shown in FIG. 2. The mixed exhaust gasses have relatively more uniform temperature, velocity, and pressure than non-mixed exhaust gasses. The wave rotor assembly 124 is an illustrative use of a wave rotor. In other embodiments, the disclosed features may be included in wave rotors used as pressure exchangers, flow dividers, flow combiners, etc.

The wave rotor assembly 124 illustratively includes a wave rotor combustor 125, an exit duct 50, and the exhaust mixer 10 as shown in FIG. 2. The wave rotor combustor 125 receives the flow of fueled air 354 and ignites the fueled air 354 to power the engine core 120. The exit duct 50 directs the combusted gasses from the wave rotor combustor 125 into a turbine 126 included in the engine core 120. The exhaust mixer 10 mixes the gasses before the gasses enter the turbine 126 as suggested in FIG. 6.

Figure 6:
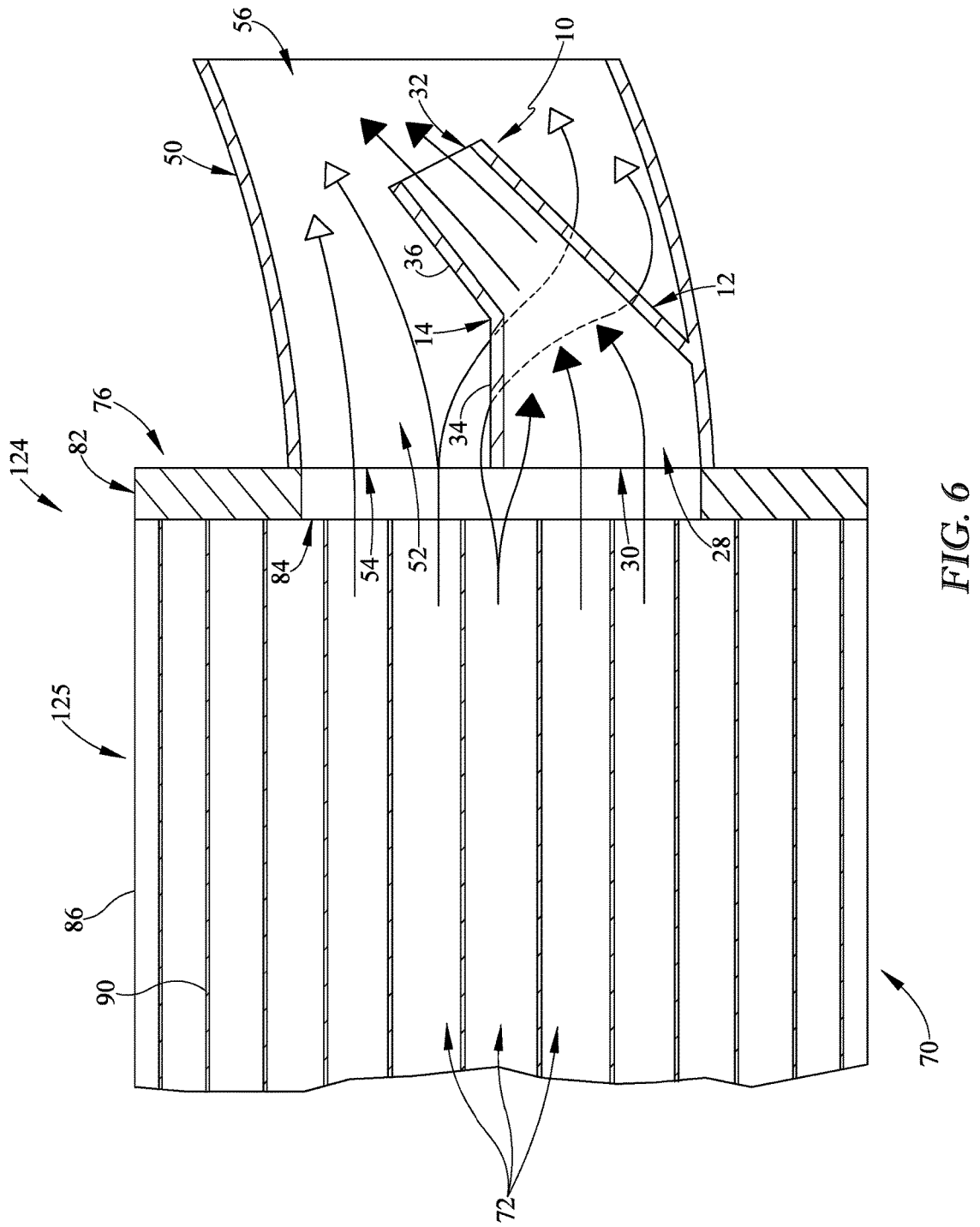
FIG. 6 is a sectional view similar to FIG. 4 showing that the exhaust mixer is positioned in the duct passage to redirect relatively-high velocity exhaust gasses received by the exit duct toward relatively-low velocity exhaust gasses received by the exit duct so that the relatively-high velocity exhaust gasses are mixed with the relatively-low velocity exhaust gasses in the duct passage.

In the illustrative embodiment, the exhaust mixer 10 includes an exhaust passage 28, an inlet aperture 30 opening into the exhaust passage 28, and an outlet aperture 32 opening into the exhaust passage 28. The relatively-high velocity exhaust gasses expelled from the wave rotor combustor 125 enter the exhaust passage 28 through the inlet aperture 30 as shown in FIG. 6. The relatively-low velocity exhaust gasses expelled from the wave rotor combustor 125 enter a duct passage 52 formed in the exit duct 50 and flow around the exhaust mixer 10. The relatively-high velocity exhaust gasses exit the exhaust passage 28 through the outlet aperture 32 and, as such, are redirected toward the relatively-low velocity exhaust gasses received by the exit duct 50. As a result, the relatively-high velocity exhaust gasses are mixed with the relatively-low velocity exhaust gasses in the duct passage 52. In some embodiments, the exhaust gasses comprise relatively-high pressures and relatively-low pressures instead of or in addition to relatively-high velocities and relatively-low velocities respectively.

The inlet aperture 30 includes an inlet area as shown in FIGS. 4 and 5. The outlet aperture 32 includes an outlet area. In the illustrative embodiment, the inlet area is greater than the outlet area. As such, the exhaust passage 28 is convergent and forms a nozzle. In the illustrative embodiment, the inlet aperture 30 and the outlet aperture 32 are sized to cause gasses in the exhaust passage 28 to have a local sonic or supersonic velocity.

In the illustrative embodiment, the exhaust mixer 10 includes a first sidewall 12, a second sidewall 14, a radial outer wall 16, and a radial inner wall 18 as shown in FIG. 5. The first and second sidewalls 12, 14 extend axially and circumferentially into the duct passage 52 relative to a central axis 20 of the engine 100 to redirect the relatively-high velocity exhaust gasses toward the relatively-low velocity exhaust gasses. The radial outer wall 16 and the radial inner wall 18 extend between and inter connect the first and second sidewalls 12, 14 to form the exhaust passage 28.

Figure 9:
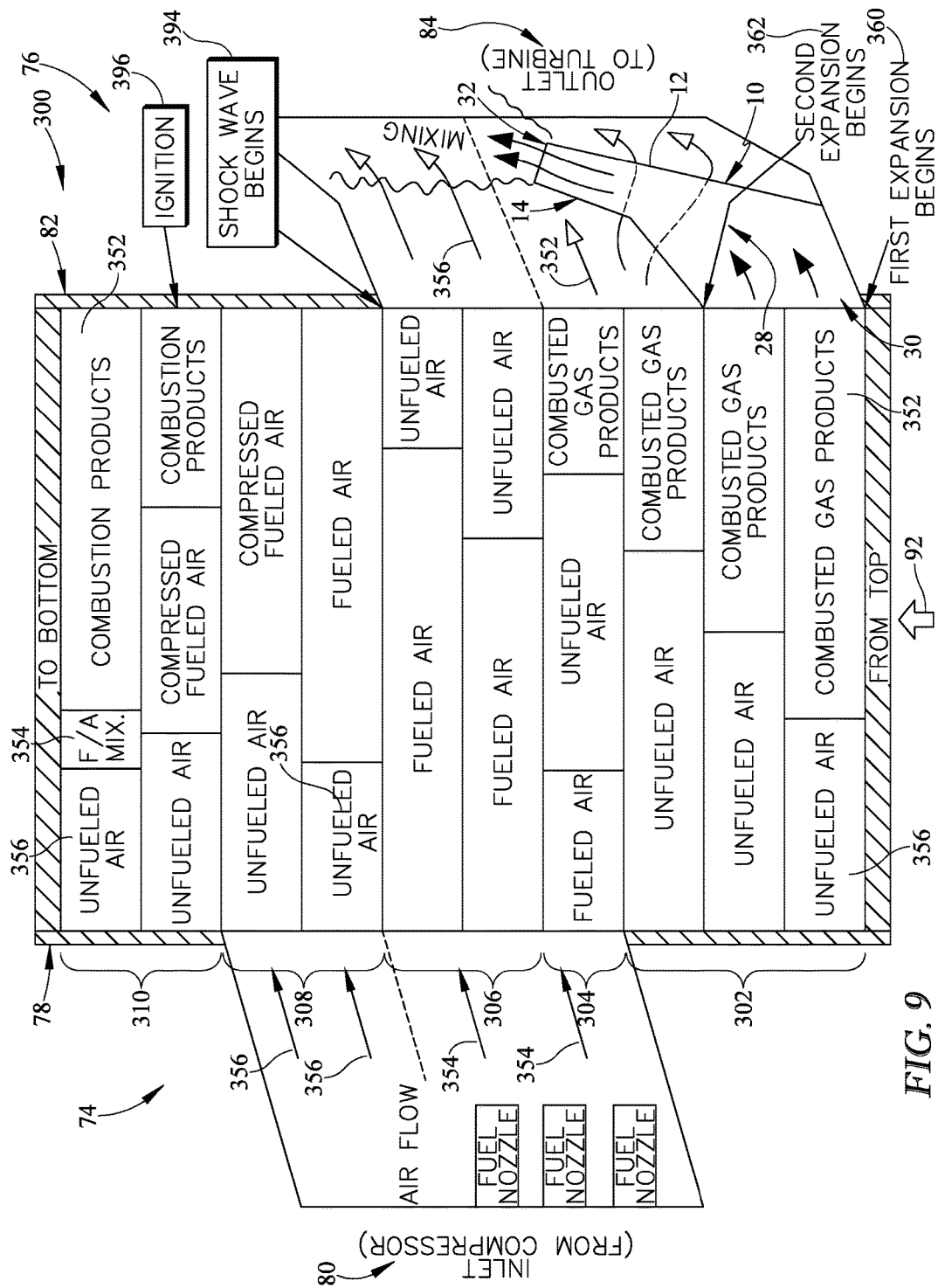
FIG. 9 is a diagrammatic view of a cycle of the combustion process that occurs within each rotor passage of the wave rotor combustor and depicts the cycle of a single rotor passage at discrete circumferential positions as it completes a revolution about the central axis.
Figure 10:
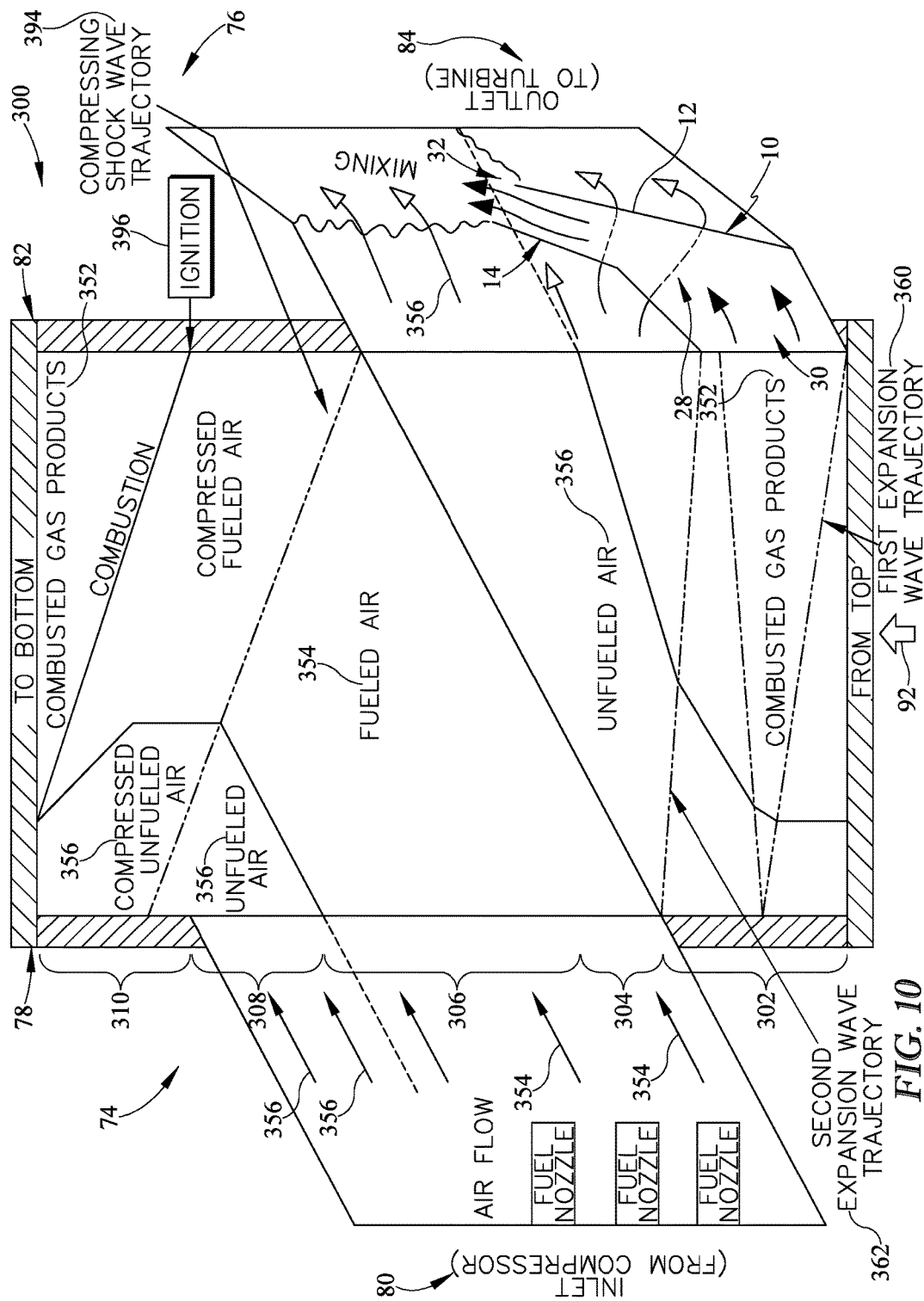
FIG. 10 is another diagrammatic view of a cycle of the combustion process that occurs within each rotor passage of the wave rotor combustor and depicts the cycle of a single rotor passage at continuous circumferential positions as it completes a revolution about the central axis.

The wave rotor combustor 125 is included in the wave rotor assembly 124 to receive and combust the fueled air 354 in the combustion process 300 as shown in FIGS. 2, 9, and 10. The wave rotor combustor 125 is configured to use transient internal fluid flow to compress fuel and air prior to combustion to improve the efficiency of combustion within the wave rotor combustor 125. The wave rotor combustor 125 is arranged to receive and combust the fueled air 354, which produces the exhaust gasses, as part of the combustion process 300.

Figure 3:
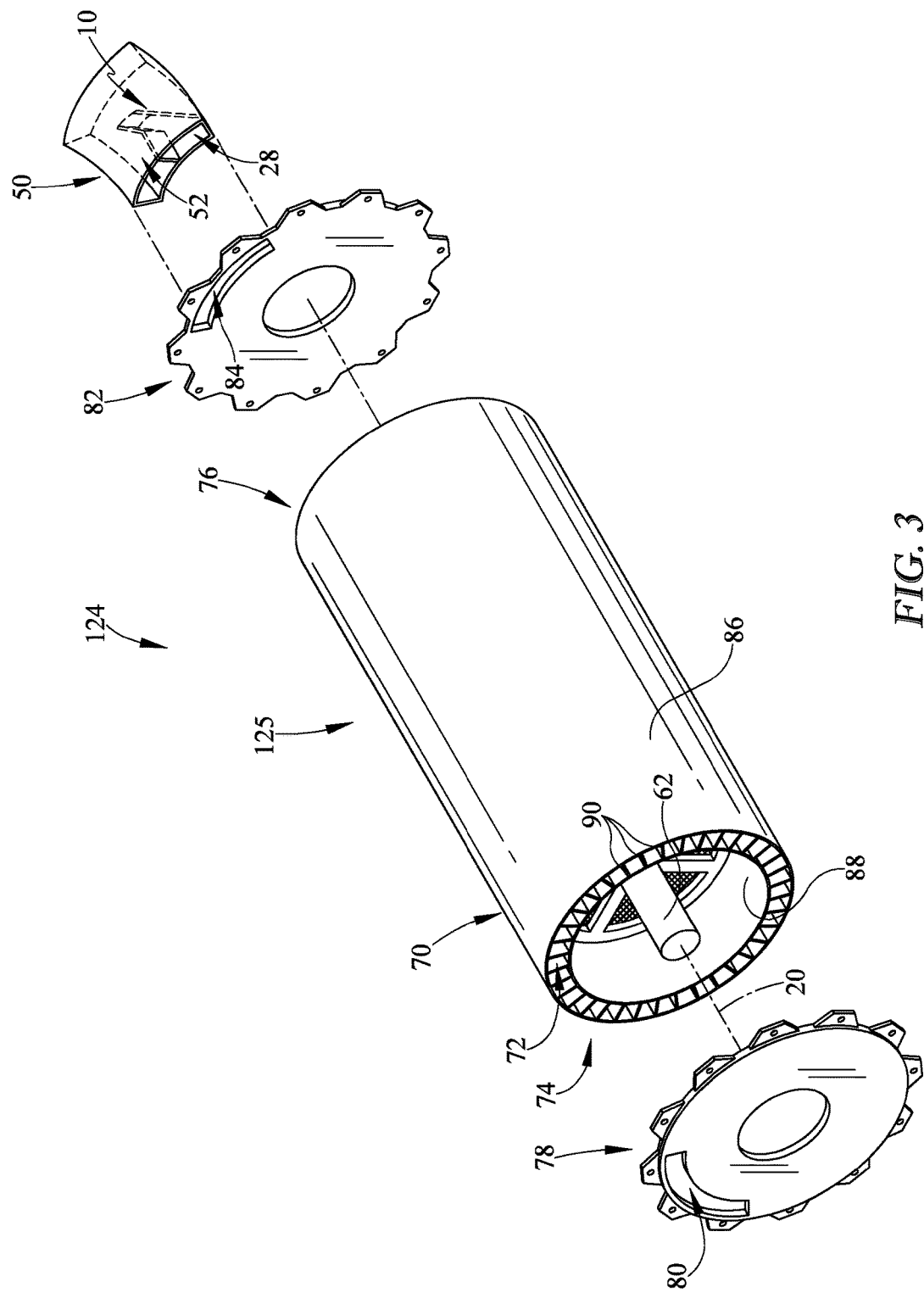
FIG. 3 is an exploded view of the wave rotor assembly showing that the wave rotor assembly includes the wave rotor combustor arranged to receive, combust, and exhaust the fuel-air mixture as part of a combustion process, the exit duct arranged to direct the gasses of the combustion process out of the rotor passages into the turbine, and the exhaust mixer located in a duct passage formed by the exit duct.

The wave rotor combustor 125 includes an inlet assembly 78, a rotor drum 70, and an outlet assembly 82 as shown in FIGS. 2 and 3. The inlet assembly 78 is formed to include an inlet port 80 that extends circumferentially along an arc about the central axis 20 of the wave rotor assembly 124. The outlet assembly 82 is formed to include an outlet port 84 that extends circumferentially along an arc about the central axis 20 of the wave rotor assembly 124. The rotor drum 70 is mounted for rotation relative to the inlet assembly 78 and the outlet assembly 82 about the central axis 20.

The rotor drum 70 is formed to include the plurality of rotor passages 72 that extend along the central axis 20 as shown in FIG. 2. In the illustrative embodiment, the rotor passages 72 rotate about the central axis 20 in a counter-clockwise direction as indicated by arrow 92. The rotor passages 72 are arranged so that the rotor passages 72 align with the inlet port 80 at predetermined intervals when the rotor drum 70 rotates about the central axis 20 to allow the fueled air 354 to flow through the inlet port 80 into the rotor passages 72. The rotor passages 72 align with the outlet port 84 at predetermined intervals when the rotor drum 70 rotates about the central axis 20 to allow the gasses in the rotor passages 72 to flow through the outlet port 84 into the exit duct 50.

The exit duct 50 directs the exhaust gasses out of the wave rotor combustor 125 into the turbine 126 included in the engine 100 as shown in FIG. 1. The exit duct 50 is coupled to the outlet assembly 82 and extends axially away from the wave rotor combustor 125 toward the turbine 126.

The exit duct 50 defines an axially extending duct passage 52, a duct inlet 54 opening into the duct passage 52, and a duct outlet 56 opening into the duct passage 52. The exhaust gasses flowing through the outlet port 84 flow through the duct inlet 54 into the duct passage 52 and exit through the duct outlet 56.

As each rotor passage 72 opens into the outlet port 84, the exhaust gasses expand and exit the rotor passage 72 through the relatively low-pressure outlet port 84. A first portion of exhaust gasses exiting the outlet port 84 and received in the duct passage 52 are relatively hot and have a relatively high-velocity. As the rotor passage 72 continues to rotate, the gasses within the rotor passage 72 continue to expand and exit through the outlet port 84. A second portion of exhaust gasses exiting through the outlet port 84 and received in the duct passage 52 are relatively cooler and have a relatively-low velocity due to the expansion of the exhaust gasses.

The exhaust mixer 10 is arranged to redirect the relatively-high velocity exhaust gasses received by the exit duct 50 toward the relatively-low velocity exhaust gasses received by the exit duct 50 so that the relatively-high velocity exhaust gasses are mixed with the relatively-low velocity exhaust gasses in the duct passage 52 as suggested in FIG. 6. In the illustrative embodiment, the exhaust mixer 10 is positioned in the duct passage 52 to receive the relatively-high velocity exhaust gasses as shown in FIGS. 4-6. The relatively-low velocity exhaust gasses are received in the duct passage 52 and flow around the exhaust mixer 10. The exhaust mixer 10 extends axially and circumferentially into the duct passage 52 to redirect the relatively-high velocity exhaust gasses toward the relatively-low velocity exhaust gasses.

The exhaust mixer 10 includes a front end 24 and a back end 26 axially spaced part from the front end 24 as shown in FIG. 4. The exhaust mixer 10 extends axially between the front and back ends 24, 26. The exhaust mixer 10 is formed to include the exhaust passage 28, the inlet aperture 30, and the outlet aperture 32 as shown in FIG. 4. The exhaust passage 28 extends through the exhaust mixer 10 between the front and back ends 24, 26 to provide a flow path for the relatively-high velocity exhaust gasses.

The inlet aperture 30 opens into the exhaust passage 28 at the front end 24 of the exhaust mixer 10. The inlet aperture 30 is positioned at a front of the duct passage 52 to receive the relatively-high velocity exhaust gasses that exit the rotor passages 72 through the outlet port 84. The relatively-high velocity exhaust gasses flow through inlet aperture 30 into the exhaust passage 28.

The outlet aperture 32 opens into the exhaust passage 28 at the back end 26 of the exhaust mixer 10. The relatively-high velocity exhaust gasses exit the exhaust passage 28 through the outlet aperture 32 toward the relatively-low velocity exhaust gasses in the duct passage 52.

The mixing of the relatively-high velocity exhaust gasses and the relatively-low velocity gasses may cause the velocity of the high-velocity exhaust gasses to decrease while increasing the average velocity of the exhaust gasses. The mixing may cause the temperature of the relatively-high velocity exhaust gasses to decrease and the temperature of the relatively-low velocity exhaust gasses to increase. As such, the temperature of the exhaust gasses may be more uniform. Additionally, the amount of noise produced by the wave rotor assembly 124 may be reduced.

The inlet aperture 30 includes the inlet area. The outlet aperture 32 includes the outlet area. In the illustrative embodiment, the inlet area is greater than the outlet area. As such, the exhaust passage 28 is convergent and forms a nozzle. In the illustrative embodiment, the inlet aperture 30 and the outlet aperture 32 are sized to cause the gasses in the exhaust passage 28 to have a local sonic or supersonic velocity. In other embodiments, the back end 26 of the exhaust mixer 10 has a convoluted shape as shown in FIGS. 7 and 8.

In the illustrative embodiment, the exhaust mixer 10 includes the first sidewall 12, the second sidewall 14, the radial outer wall 16, and the radial inner wall 18 as shown in FIGS. 3-6. The first sidewall 12, the second sidewall 14, the radial outer wall 16, and the radial inner wall 18 cooperate to define the exhaust passage 28, the inlet aperture 30, and the outlet aperture 32 as shown in FIGS. 4 and 5.

The first sidewall 12 extends axially and circumferentially into the duct passage 52 relative to the central axis 20 to redirect the relatively-high velocity exhaust gasses toward the relatively-low velocity exhaust gasses. The first sidewall 12 is coupled to and extends from the exit duct 50 at the front end 24 of the exhaust mixer 10. In the illustrative embodiment, the first sidewall 12 extends between and interconnects outer and inner radial walls of the exit duct 50 at the front end of the exhaust mixer 10. A height of the first sidewall 12 decreases from the front end 24 to the back end 26 of the exhaust mixer 10 as shown in FIG. 5.

The second sidewall 14 is spaced apart circumferentially from the first sidewall 12 as shown in FIGS. 4 and 5. The second sidewall 14 is coupled to and extends from the exit duct 50 at the front end 24 of the exhaust mixer 10. The second sidewall 14 extends axially and circumferentially into the duct passage 52 to redirect the relatively-high velocity exhaust gasses toward the relatively-low velocity exhaust gasses. In the illustrative embodiment, the second sidewall 14 extends between and interconnects the outer and inner radial walls of the exit duct 50 at the front end of the exhaust mixer 10. A height of the second sidewall 14 decreases from the front end 24 to the back end 26 of the exhaust mixer 10 as shown in FIG. 5.

Illustratively, the second sidewall 14 includes a fore leg 34 and an aft leg 36 as shown in FIG. 4. The fore leg 34 extends axially into the duct passage 52. The aft leg 36 extends from the fore leg 34 axially and circumferentially into the duct passage 52.

The radial outer wall 16 is spaced apart radially from the central axis 20 as shown in FIG. 5. The radial outer wall 16 extends circumferentially between and interconnects the first and second sidewalls 12, 14 to form a portion of the exhaust passage 28 extending through the exhaust mixer 10.

The radial inner wall 18 is spaced apart radially from the central axis 20 as shown in FIG. 5. The radial inner wall 18 is located radially between the radial outer wall 16 and the central axis 20. The radial inner wall 18 extends circumferentially between and interconnects the first and second sidewalls 12, 14 to form another portion of the exhaust passage 28 extending through the exhaust mixer 10.

Another illustrative exhaust mixer 210 for use in the wave rotor assembly 124 is shown in FIGS. 7 and 8. The exhaust mixer 210 is substantially similar to the exhaust mixer 10 shown in FIGS. 1-6 and described herein. Accordingly, similar reference numbers in the 200 series indicate features that are common between the exhaust mixer 10 and the exhaust mixer 210. The description of the exhaust mixer 10 is hereby incorporated by reference to apply to the exhaust mixer 210, except in instances when it conflicts with the specific description and drawings of the exhaust mixer 210.

The back end 226 of the exhaust mixer 210 is formed to have a plurality of lobes 238 to form a convoluted shape as shown in FIGS. 7 and 8. The convoluted shape may increase the mixing of the relatively-high velocity exhaust gasses and the relatively-low velocity exhaust gasses. The first sidewall 12, the second sidewall 14, the radial outer wall 16, and the radial inner wall 18 are deformed at the back end 226 of the exhaust mixer 210 to form the convoluted shape.

The wave rotor assembly 124 is included in the gas turbine engine core 120 to power the turbine 126 as shown, for example, in FIG. 1. The engine core 120 includes the compressor 122, the wave rotor assembly 124, and the turbine 126. The compressor 122 is configured to compress and deliver air to the wave rotor assembly 124. The turbine 126 extracts work from the combusted gasses (sometimes called hot high-pressure products or exhaust gasses) to drive the compressor 122 and the fan assembly 130. The fan assembly 130 pushes air through and around the engine 100 to provide thrust for an aircraft.

During operation of the wave rotor assembly 124, fuel and compressed air, produced by the compressor 122, is drawn axially into each rotor passage 72 through the inlet port 80 formed in the inlet assembly 78 as shown in FIGS. 2 and 3. As each rotor passage 72 rotates about the central axis 20, the compressed air and fuel are mixed together and are then ignited to produce the hot high-pressure products. The hot high-pressure products are blocked from escaping the rotor passage 72 by the inlet assembly 78 and an outlet assembly 82 until the rotor passage 72 aligns with an outlet port 84 formed in the outlet assembly 82. The hot high-pressure products exit the rotor passage 72 through the outlet port 84 into the turbine 126.

In the illustrative embodiment, the wave rotor combustor 125 includes the inlet assembly 78, the outlet assembly 82 spaced apart from the inlet assembly 78 along the central axis 20 of the engine 100, and the rotor drum 70 positioned therebetween as shown in FIGS. 2 and 3. The inlet and outlet assemblies 78, 82 are spaced apart from the rotor drum 70 to form a gap between the rotor drum 70 and each assembly 78, 82 to control the passage of flow into and out of the rotor passages 72. In some embodiments, the assemblies 78, 82 are arranged to seal the rotor drum 70 to minimize leakage of flow out of the rotor passage 72.

In the illustrative embodiment, the inlet assembly 78 includes a single inlet port 80 and the outlet assembly 82 includes a single outlet port 84. In other embodiments, the inlet assembly 78 is formed to include a plurality of inlet ports 80 and the outlet assembly 82 is formed to include a plurality of outlet ports 84.

The rotor drum 70 is mounted for rotation about the central axis 20 relative to the inlet assembly 78 and outlet assembly 82 as suggested by arrow 92 in FIG. 2. In other embodiments, the rotor drum 70 rotates in an opposite direction. The rotor drum 70 includes an inlet end 74 and an outlet end 76. The rotor drum 70 extends axially along the central axis 20 between the inlet and outlet ends 74, 76.

The rotor drum 70 includes an outer tube 86, an inner tube 88, and a plurality of webs 90 as shown in FIG. 2. The outer tube 86, the inner tube 88, and the plurality of webs 90 cooperate to form the plurality of axially extending rotor passages 72. In the illustrative embodiment, the rotor passages 72 extend axially and generally parallel with the central axis 20. In other embodiments, the rotor passages 72 extend axially along and circumferentially about the central axis 20.

The outer tube 86 extends around the central axis 20 to form a radially outer portion of the rotor passages 72. The inner tube 88 extends around the central axis 20 and is positioned radially between the central axis 20 and the outer tube 86 to form a radially inner portion of the rotor passages 72. The plurality of webs 90 are spaced apart circumferentially and extend between and interconnect the outer tube 86 and the inner tube 88 to separate the plurality of rotor passages 72.

In the illustrative embodiment, the rotor passages 72 are generally parallel with the central axis 20 and the rotor drum 70 is rotated by a drive shaft 62. In other embodiments, the rotor passages 72 extend axially along and circumferentially around the central axis 20. In some embodiments, the rotor passages 72 are arranged to cause the rotor drum 70 to rotate as a result of the shape of the rotor passages 72 and the combustion process that occurs within the rotor passages 72.

An illustrative combustion process 300 occurs within the rotor passages 72 as the rotor passages 72 rotate about the central axis 20 as suggested in FIGS. 9 and 10. The combustion process 300 is substantially a constant volume combustion process.

The combustion process 300 occurs in each rotor passage 72 of the wave rotor combustor 125 as depicted in a space-time wave diagram shown in FIGS. 9 and 10. The wave diagram shown in FIG. 9 depicts the sequence of events occurring during one cycle within a rotor passage 72 at discrete circumferential positions. The arrow 92 indicates the direction of rotation of the rotor passage 72. Upon the rotation of the rotor drum 70, each of the rotor passages 72 are sequentially brought into alignment with the inlet port 80 and the outlet port 84.

The combustion process 300 is depicted in another space-time wave diagram shown in FIG. 10. The wave diagram shown in FIG. 10 depicts the sequence of events occurring during one cycle within a rotor passage 72 in continuous circumferential positions. The arrow 92 indicates the direction of rotation of the rotor passage 72.

The combustion process 300 is periodic such that the top of each wave diagram loops around and join with itself at the bottom of the diagram. The wave diagrams, for the purpose of description, may be started at any point. However, for convenience, the description is started at step 302 corresponding to the bottom of the wave diagrams shown in FIGS. 9 and 10.

In step 302, the inlet end 74 of the rotor passage 72 is blocked by the inlet assembly 78. The outlet end 76 of the rotor passage 72 is aligned with and opens into the outlet port 84 formed in the outlet assembly 82. The rotor passage 72 contains unfueled air 356 and combusted gas products 352. The combusted gas products 352 are hot high-pressure products resulting from the combustion of the fueled air 354.

As the rotor passage 72 opens into the outlet port 84, the combusted gas products 352 expand and exit the rotor passage 72 through the relatively low-pressure outlet port 84. A first expansion wave 360 originates from the outlet end 76 of the rotor passage 72 and propagates toward the inlet end 74 expelling the combusted gas products 352 through the outlet port 84. The combusted gas products 352 exiting the outlet port 84 are relatively hot and relatively-high velocity exhaust gasses. The relatively-high velocity exhaust gasses flow through the exhaust passage 28 of the exhaust mixer 10 as shown in FIGS. 9 and 10. The first expansion wave 360 may reflect at the inlet end 74 and may be redirected toward the outlet end 76.

Illustratively, the exhaust mixer 10 alters the combustion process 300 as compared to a wave rotor without an exhaust mixer 10. The exhaust mixer 10 alters the internal wave rotor cycle 300 such that two sets of expansions occur within the rotor passages which may more efficiently expand the gasses to arrive at a greater total pressure rise for the combustor as well as a more uniform set of exhaust properties. The way rotor assembly 124 has at least two stages of expansion which are used to more adequately capture the pressure gain potential.

As the rotor passage 72 continues to rotate, a second expansion wave 362 originates from the outlet end 76 of the rotor passage 72 at the fore leg 34 and propagates toward the inlet end 74 expelling the combusted gas products 352 through the outlet port 84 as shown in FIG. 10. As such, the combusted gas products 352 continue to expand and exit through the outlet port 84 and the unfueled air 356 expands toward the outlet port 84. The combusted gas products 352 exiting through the outlet port 84 after the second expansion wave 362 are relatively cooler and relatively-low velocity exhaust gasses due to the expansion of the combusted gas products 352. The relatively-low velocity gasses flow through the duct passage 52 of the exit duct 50 around the exhaust mixer 10 as shown in FIGS. 9 and 10. The relatively-high velocity gasses exit the exhaust mixer 10 at the back 26 of the exhaust mixer 10 and are directed toward the relatively-low velocity gasses to mix the exhaust gasses.

In a step 304, the rotor passage 72 aligns with and opens into the inlet port 80. The fueled air 354 is directed through the inlet port 80 into the rotor passage 72. The fueled air 354 has relatively greater pressure than the remaining unfueled air 356 and combusted gas products 352. As such, the fueled air 354 is drawn into the rotor passage 72 and the unfueled air 356 and combusted gas products 352 flow axially through the outlet port 84.

In the illustrative embodiment, the compressor 122 provides a flow of unfueled air 356 upstream of the inlet port 80. Illustratively, fuel nozzles continuously spray fuel into a portion of the flow of unfueled air 356 upstream of the inlet port 80. The fuel and air mix before entering the rotor passage 72 to form the fueled air 354. The fueled air 354 is separated from the combusted gas products 352 in the rotor passage 72 by the unfueled air 356. As such, the fueled air 354 is blocked from unintentional ignition.

In a step 306, the fueled air 354 continues to be directed into the rotor passage 72 until the unfueled air 356 has been significantly expelled out of the rotor passage 72. The unfueled air 356 is relatively cooler than the combusted gas products 352. The relatively-high velocity exhaust gasses exiting the exhaust mixer 10 are mixed with the unfueled air 356.

The wave rotor combustor 125 is arranged such that, as the unfueled air 356 is significantly expelled out of the rotor passage 72, the rotor passage 72 rotates beyond the outlet port 84. As a result, the outlet assembly 82 blocks the fueled air 354 from escaping through the outlet end 76 of the rotor passage 72. When the outlet end 76 of the rotor passage 72 is closed by the outlet assembly 82, a shock wave 394 begins at the outlet end 76 of the rotor passage 72 and propagates toward the inlet end 74. The shock wave 394 causes the fueled air 354 to compress.

In a step 308, the flow of fueled air 354 ends and the flow of unfueled air 356 continue to enter the rotor passage 72 due to the pressure in the rotor passage 72 being lower than the pressure at the inlet 80. The compressing shock 394 compresses the fueled air 354 and the unfueled air 356.

In a step 310, the rotor passage 72 rotates beyond the inlet port 80 to block the flow of unfueled air 356 from entering the rotor passage 72. The fluid within the rotor passage 72 is blocked from escaping the rotor passage 72 by the inlet assembly 78 at the inlet end 74 and by the outlet assembly 82 at the outlet end 76. An ignition source 396 ignites the compressed fueled air 354 at the outlet end 76 of the rotor passage 72. In other embodiments, the compressed fueled air 354 ignites as a result of auto-ignition.

As the fueled air 354 combusts, the fueled air 354 expands to form the combusted gas products 352. The portion of the unfueled air 356 that did not receive fuel added by the fuel nozzle, having entered during step 308, experiences no combustion and is compressed by shock wave 394. The combusted gas products 352 expand and further compress the unfueled air 356. The rotor passage 72 continues to rotate about the central axis 20 and returns to step 302 at the bottom of the wave diagram shown in FIGS. 9 and 10.

Some wave rotor pressure gain combustors use one discharge port for exhaust gasses. A wave rotor with on board combustion may have exhaust flow having a large variation in both temperature and stagnation pressure, in particular, in the circumferential direction. Some simple on-board combustion wave rotor cycles have high variation in exhaust gas properties within the single exhaust port. The temperatures may range from near peak combustion temperature to that of the inlet air temperature. The stagnation pressure may have with the exit velocity which may range from supersonic to subsonic in nature. Some wave rotors involve turbomachinery downstream of the exit of the wave rotor. As such, wave rotors with compatible components are desired.

According to an aspect of the present disclosure, a method by which, external to the wave rotor passage 72, exhaust gasses are mixed to provide a uniform exit velocity pattern. The mixing of the gasses and causes the temperature and pressure pattern into downstream turbine components to be similar to those experienced in other gas turbines. The exhaust mixer 10 alters the internal wave rotor cycle such that two sets of expansions occur within the rotor passages which may more efficiently expand the gasses to arrive at a greater total pressure rise for the combustor as well as a more uniform set of exhaust properties. As such, a portion of the high temperature, high velocity gasses may not need to be bypassed into a high pressure turbine before mixing with the low energy gasses.

The wave rotor assembly 124 includes a first port to deliver an expansion of hot combustion gasses in the rotor passages 72 to a first static pressure Ps1. As the rotor passage 72 moves out of the first port, it encounters a second exit port at a lower static pressure PsA and the gasses exiting the rotor passage 72 undergo a second expansion. Flow within the portion of the exhaust mixer 10, connected to the first port, experiences a turn and an area reduction resulting in a flow at a local sonic or supersonic velocity at the exit of the exhaust mixer 10 as shown in FIG. 4. The static pressure at the exit of the exhaust mixer 10 is about PsA.

With the resulting stagnation pressure of the flow exiting the exhaust mixer 10 being high relative to that in duct passage 52, an ejector mixing process is accomplished within the portion of the passage downstream of the duct passage 52 and a portion of the total energy both thermal and kinetic is transferred to the exhaust flow of the duct passage 52. The ejector action may cause the static pressure within the duct passage 52 to be reduced compared to that were such ejector action is not present. This may cause a more rapid discharge of the flow in the duct passage 52 which may add to its stagnation pressure and cause the discharge of the gasses to be accomplished in a more rapid manner.

According to another aspect of the present disclosure, the wave rotor assembly 124 may use the observation that hot, high velocity gas occurs at the extreme inlet edge of the outlet port 84. The remainder of the outlet port 84 is filled with lower temperature and lower velocity gasses. The wave rotor assembly 124 divides the outlet port 84 into at least two portions choosing the dividing point to capture the different energy level gasses. The exhaust mixer 10 is formed in the exit duct 50 shaping the duct to locate the higher temperature, higher velocity flow near the center of the duct passage 52 and providing annular space around the exhaust mixer 10 so that the lower velocity, higher static pressure portion of the flow can flow around it. The two flows are released and allowed to mix as they flow toward the downstream components.

The hot, high velocity gasses act as an ejector which drags the low energy, but high static pressure gasses along causing turbulent mixing along the duct passage 52 to the downstream turbine. In some embodiments, the exhaust mixer 10 uses the concept of convolutions in the exit lip of the exhaust mixer 10 so that the hot, high velocity gasses are brought into intimate contact with the cool, low velocity gas over an increased perimeter.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A wave rotor assembly comprising
a wave rotor combustor including an aft plate formed to include an exit port that extends circumferentially along an arc about a central axis of the wave rotor combustor and a rotor drum mounted for rotation relative to the aft plate about the central axis, the rotor drum formed to include a plurality of rotor passages that extend along the central axis and are arranged so that the rotor passages align with the exit port at predetermined intervals when the rotor drum rotates about the central axis to allow exhaust gasses in the rotor passages to flow through the exit port, an exit duct coupled to the aft plate that defines a duct passage arranged to receive the exhaust gasses flowing through the exit port, the exit duct including a first duct wall and a second duct wall spaced apart circumferentially from the first duct wall to define a portion of the duct passage, and an exhaust mixer located in the duct passage and arranged to circumferentially redirect relatively-high velocity exhaust gasses received by the exhaust mixer in the exit duct toward relatively-low velocity exhaust gasses received by a remainder of the exit duct so that the relatively-high velocity exhaust gasses are mixed with the relatively-low velocity exhaust gasses in the duct passage downstream of the exhaust mixer, wherein the exhaust mixer includes a first radial sidewall that extends axially and circumferentially at an angle away from the first duct wall toward the second duct wall only partway into the duct passage relative to the central axis, the exhaust mixer being angled with respect to the remainder of the exit duct to redirect the relatively-high velocity exhaust gasses toward the relatively-low velocity exhaust gasses, the exhaust mixer having a converging area to accelerate the relatively-high velocity exhaust gasses.

2. The wave rotor assembly of claim 1, wherein the exhaust mixer further includes a second sidewall spaced apart circumferentially from the first sidewall and the second sidewall extends axially and circumferentially into the duct passage to redirect the relatively-high velocity exhaust gasses toward the relatively-low velocity exhaust gasses.

3. The wave rotor assembly of claim 2, wherein the second sidewall includes a forward leg that extends axially into the duct passage and an aft leg that extends from the forward leg axially and circumferentially into the duct passage.

4. The wave rotor assembly of claim 2, wherein the exhaust mixer further includes a radial outer wall and a radial inner wall spaced apart radially from the radial outer wall relative to the central axis and the radial outer wall and the radial inner wall extend between and interconnect the first and second sidewalls to form a mixer passage extending through the exhaust mixer.

5. The wave rotor assembly of claim 4, wherein the exhaust mixer includes a front end and a back end axially spaced apart from the front end relative to the central axis, a height of the first sidewall decreases from the front end to the back end, and a height of the second sidewall decreases from the front end to the back end.

6. The wave rotor assembly of claim 1, wherein the exhaust mixer forms a mixer passage extending through the exhaust mixer, an inlet aperture opening into the mixer passage, and an outlet aperture opening into the mixer passage.

7. The wave rotor assembly of claim 6, wherein the inlet aperture has an inlet area, the outlet aperture has an outlet area, and the inlet area is greater than the outlet area.

8. The wave rotor assembly of claim 7, wherein the relatively-high velocity exhaust gasses exit the exhaust mixer through the outlet aperture at a supersonic velocity.

9. The wave rotor assembly of claim 6, wherein the exhaust mixer has a front end adjacent to the inlet aperture and a back end axially spaced apart from the front end and the back end has a convoluted shape.

10. A wave rotor assembly comprising a wave rotor combustor including an aft plate formed to include an exit port and a rotor drum mounted for rotation relative to the aft plate, the rotor drum formed to include a plurality of rotor passages arranged to align with the exit port during rotation of the rotor drum, an exit duct coupled to the aft plate that defines a duct passage arranged to receive exhaust gasses flowing through the exit port, and an exhaust mixer located in the duct passage and arranged to circumferentially redirect relatively-high velocity exhaust gasses received by the exhaust mixer in the exit duct toward relatively-low velocity exhaust gasses received by a remainder of the exit duct so that the relatively-high velocity exhaust gasses are mixed with the relatively-low velocity exhaust gasses in the duct passage downstream of the exhaust mixer, wherein the exhaust mixer is formed to include a mixer passage extending through the exhaust mixer angled with respect to the remainder of the exit duct, an inlet aperture opening into the mixer passage, and an outlet aperture opening into the mixer passage, the inlet aperture has an inlet area, the outlet aperture has an outlet area, and the inlet area is greater than the outlet area to accelerate the relatively-high velocity exhaust gasses.

11. The wave rotor assembly of claim 10, wherein the exhaust mixer is arranged to redirect relatively-high velocity exhaust gasses received by the exit duct in a circumferential direction toward relatively-low velocity exhaust gasses received by the exit duct so that the relatively-high velocity exhaust gasses are mixed with the relatively-low velocity exhaust gasses in the duct passage.

12. The wave rotor assembly of claim 10, wherein the exhaust mixer includes a first sidewall that extends axially and circumferentially into the duct passage to redirect the relatively-high velocity exhaust gasses toward the relatively-low velocity exhaust gasses.

13. The wave rotor assembly of claim 12, wherein the exhaust mixer includes a second sidewall that is circumferentially spaced apart from the first sidewall and extends axially and circumferentially into the duct passage to redirect the relatively-high velocity exhaust gasses toward the relatively-low velocity exhaust gasses.

14. The wave rotor assembly of claim 10, wherein the exhaust mixer includes a first sidewall, a second sidewall circumferentially spaced apart from the first sidewall, a radial outer wall, and a radial inner wall spaced apart radially from the radial outer wall relative to a central axis of the wave rotor combustor and the radial outer wall and the radial inner wall extend between and interconnect the first and second sidewalls between the front and back ends to define the mixer passage.

15. The wave rotor assembly of claim 14, wherein the exhaust mixer includes a front end and a back end axially spaced apart from the front end relative to the central axis, a height of the first sidewall decreases from the front end to the back end, and a height of the second sidewall decreases from the front end to the back end.

16. The wave rotor assembly of claim 10, wherein the relatively-high velocity exhaust gasses exit the exhaust mixer through the outlet aperture at a local sonic velocity.

17. A method of making a wave rotor assembly, the method comprising providing a wave rotor, an exit duct, and an exhaust mixer, the wave rotor including an aft plate formed to include an exit port and a rotor drum mounted for rotation relative to the aft plate, the rotor drum formed to include a plurality of rotor passages arranged to align with the exit port at predetermined intervals during rotation of the rotor drum, and the exit duct defines a duct passage, coupling the exit duct to the aft plate to cause the duct passage to be arranged to receive exhaust gasses flowing through the exit port, and locating the exhaust mixer in the duct passage to circumferentially redirect exhaust gasses received by the exit duct, the exit duct is arranged to receive relatively-low velocity exhaust gasses and relatively-high velocity exhaust gasses in the exhaust mixer and the exhaust mixer is arranged to redirect the relatively-high velocity exhaust gasses received by the exhaust mixer in the exit duct toward the relatively-low velocity exhaust gasses received by a remainder of the exit duct so that the relatively-high velocity exhaust gasses are mixed with the relatively-low velocity exhaust gasses in the duct passage downstream of the exhaust mixer, the exhaust mixer being angled with respect to the remainder of the exit duct to redirect the relatively-high velocity exhaust gasses toward the relatively-low velocity exhaust gasses, and wherein the exhaust mixer includes a radial sidewall that extends axially and circumferentially at an angle only partway into the duct passage relative to the central axis and relative to the remainder of the exit duct, the exhaust mixer having a converging area to accelerate the relatively-high velocity exhaust gasses.

* * * * *